March 20, 1956

S. E. GAIL 2,738,660

VIBRATION DAMPER

Filed April 16, 1954

INVENTOR.
STEWART E. GAIL
BY
*Frank H. Harmon*
ATTORNEY

March 20, 1956     S. E. GAIL     2,738,660
VIBRATION DAMPER

Filed April 16, 1954     2 Sheets-Sheet 2

*INVENTOR.*
STEWART E. GAIL
BY
ATTORNEY

United States Patent Office 2,738,660
Patented Mar. 20, 1956

2,738,660

VIBRATION DAMPER

Stewart E. Gail, Maple Heights, Ohio, assignor to Jack & Heintz, Inc., Cleveland, Ohio, a corporation of Delaware Application April 16, 1954, Serial No. 423,583

6 Claims. (Cl. 64—1)

This invention relates to improvements in torsional dampers for suppressing resonant vibrations in rotary shaft driving mechanism, such as are encountered in engine driven accessories.

The conventional drive in an engine driven aircraft generator includes a flexible quill shaft interposed between the engine driving spline and the generator armature. The engine mass and the generator armature mass, combined with the torsional spring of the quill shaft together form a mechanical resonant system that may be excited either by torsional input vibrations at the resonant frequency or periodic electrical disturbances, such as are caused by a hunting condition due to unstable regulators. By the incorporation of a loose spline drive in this series system, a rectifying action is interposed, preventing a reversal of torque and resonance whenever the torsional amplitude does not exceed the amount of back lash in the loose spline. However, in the case of large torsional stimulation such as encountered with misfiring or backfiring of a reciprocating engine drive, a malfunctioning regulator, or switching of large blocks of load, it is possible to establish a resonating condition in spite of this fairly large clearance, or back lash, in the loosely engaging splines of the driving mechanism.

It is one of the primary objects of my invention to provide an improved driving unit which will inherently suppress such resonant vibrations.

A more specific object is to provide a hydraulic drive, in the form of loosely mating splines between the quill shaft and the main hollow accessory shaft with sealed-in hydraulic fluid in the cavities of the loosely engaging splines to provide either a viscous damper or a velocity damper, as desired, in the system to absorb sufficient energy for suppression or decay of an impending resonant condition.

Another object is to provide means for adjustment of spline clearances, or of the viscosity of the hydraulic fluid, for adjusting the amount of damping in various applications.

A further object is to provide such an hydraulic unit that will not only inherently suppress resonant vibrations, but permit the flexible quill shaft to absorb non-resonant pulsations.

Moreover, by introducing hydraulic oil in the spline portion of the unit for damping purposes, I also minimize wear under conditions where damping is required.

With the foregoing and other objects in view, the invention resides in the combination of parts and in the details of construction hereinafter set forth in the following specifications and appended claims, certain embodiments thereof being illustrated in the accompanying drawings, in which:

Figure 1:
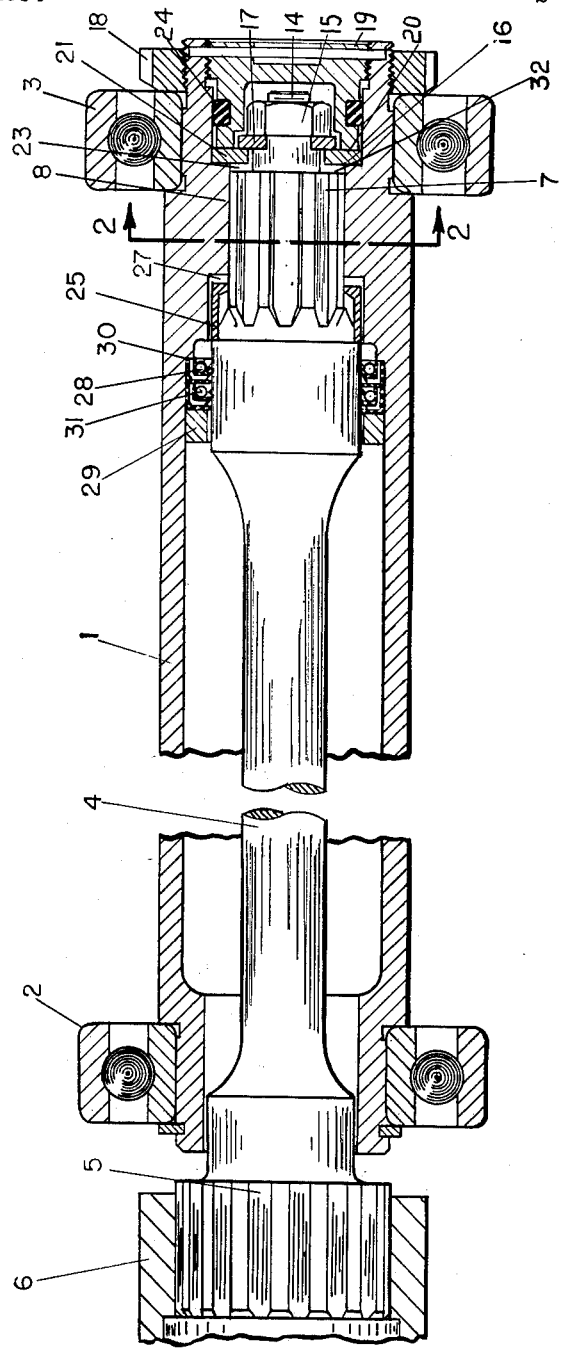
Figure 1 is a view in longitudinal section through a hollow accessory drive shaft, showing in side elevation a flexible quill shaft therein and splined at its input end to an engine driven member and loosely splined at its other end to the hollow shaft with hydraulic fluid in the cavities of the loosely mating splines of the quill and the hollow shaft.
Figure 3:
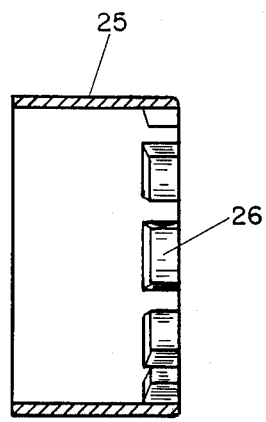
Figure 3 is a view in longitudinal section taken through the spline terminating adapter.
Figure 4:
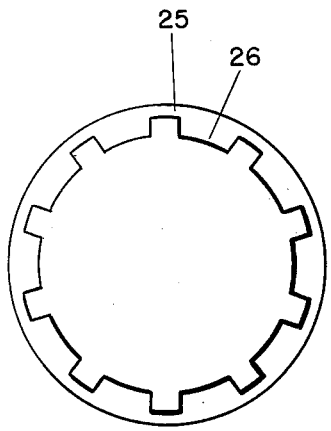
Figure 4 is a view in front elevation of the adapter shown in Figure 3.

Referring more particularly to the drawings, I have shown a hollow shaft 1 supported for rotation by bearings 2 and 3. For purposes of illustration, the hollow shaft 1 may be considered an armature shaft of an aircraft generator driven by an aircraft engine.

Inside of hollow shaft 1 I mount a flexible quill shaft 4 which carries external splines 5 at its input end to mate, without undue clearance, with internal splines of member 6, which I characterize as a member that is driven by, or a part of, a pulsating power source such as an aircraft engine or the like.

Figure 2:
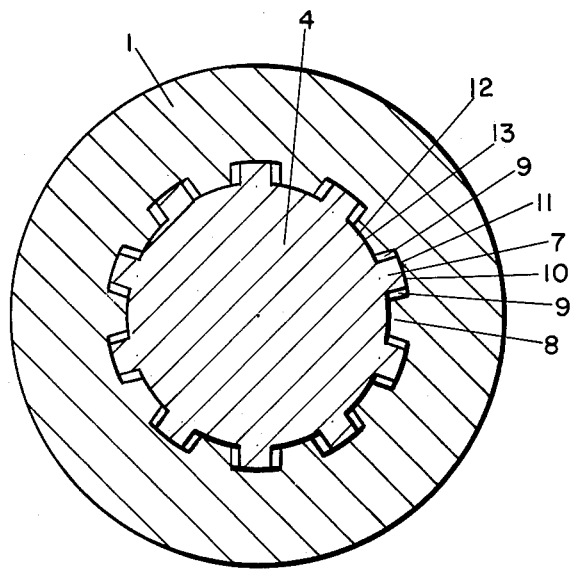
Figure 2 is an enlarged view in section taken along line 2—2 of Figure 1, showing the loosely mating splines of the quill shaft and the hollow drive shaft.

At the anti-drive end of the quill shaft, I provide the quill shaft 4 with a series of external axially extending splines 7 to loosely mate with internal axially extending splines 8 on the hollow shaft 1. These splines mate so loosely, as shown in Figure 2, as to enable me to fill the cavities, or spaces, 9, between the splines with hydraulic oil.

These spaces 9 provide for appreciable rotational clearance, in either direction of rotation of the quill shaft 4 between the quill shaft splines 7 and the hollow shaft splines 8. However, minimum operating clearance should be provided between the outside diameters of splines 7 and the bottom of the cavities 10 between the splines 8, such as shown at 11. Likewise, minimum operating clearance should also be provided between the inside diameters of splines 8 and the bottoms of the cavities 12 between the splines 7, such as shown at 13.

The outboard end of the quill shaft 4 is reduced and screw threaded at 14 to receive a nut 15, between which latter and a shoulder 16 of the quill shaft is interposed a washer 17. The outboard end of the hollow shaft 1 is externally threaded to receive a retainer nut 18 for bearing 3 and is internally threaded to receive a hollow screw plug 19, the inner, and major portion of which is unthreaded to slide snugly into the hollow shaft. The forward, or inner, end 20 of the plug 19 bears against a washer plate 21 of predetermined thickness, which in turn, bears on the ends of the internal splines 8. The difference in thickness and the length of quill shaft shoulder 32 defines the end clearance, or orifice size, between splines 7 and plate 21. This serves to provide a means for controlling the flow of oil from cavity to cavity 9 as splines 7 move relative to splines 8 in alternate directions. I also provide a recess midway of the outer surface of the plug 19 to receive an O ring oil seal 24.

The outboard end of the quill shaft splines are square, with an axial space 23 between the same and plate 21. However, as a matter of convenience in manufacture machining, the inboard ends are provided with machine cutter run-out. It is for this reason that I prefer to press fit a spline adapter 25 onto the quill shaft and provide the adapter 25 with internal splines 26 to mate snugly with the quill shaft splines 7, leaving small axial space 27 between the adapter and the adjacent internal shoulder of the hollow shaft. Thus, the distance between the adapter 25 and the plate 21 becomes the operating area of the combined hydraulic drive and damper. To the left of the adapter I provide a pair of seals 28 and 31 positioned by retainer ring 29 and shoulder 30.

As stated before, the hydraulic drive and damper may be adjusted and predetermined by the selection of oils of various viscosities. Mechanically, the drive and damper characteristics are built in. However, adjustment may be effected by replacement of plate 21 with other plates of various thicknesses.

I am aware that various friction damper designs have been used in connection with the quill shaft drive of aircraft generators in order to limit the maximum amplitude of twist in the quill shaft. However, friction is inherently a wearing type operation and it is quite difficult to provide sufficient wear in the damper to last the desired life of the unit. Likewise, the damper invariably is of considerable size in order to provide sufficient cooling capacity and to meet the design limitations of the wearing surface. Moreover, the damper weight is inherently large, thus putting an additional penalty on the weight of the unit.

Various attempts have been made to delete the need or use of dampers generally with limited success. One approach has been an attempt to use the free, loose, or back lash spline, between the quill shaft and the engine member, without any damping, only to quickly discover that shaft failures still occurred, thus necessitating a reintroduction of quill shaft friction damping to the torsional twist of the quill shaft. Another approach has been made to this same loose spline application, wherein a friction damper has been applied directly across the clearance of the spline. The friction damper is located within the hollow armature shaft and is extremely small in size and performs very well initially although its service lift is extremely short. Another approach to the free spline design is the use of a friction damper mounted within the engine mounting flange cavity, which is sensitive to quill shaft deflection. This latter approach does not provide allowance for radial displacement as encountered in misalignment between the driving and driven shaft. The introduction of the free or clearance spline does tend to reduce the damper requirements. It should be borne in mind that all damper applications sensing the quill shaft twist are subject to continual wear during normal operation under non-resonant frequency conditions which do not require the damper action.

From the foregoing it will be seen that I have provided a new and novel damping device that is incorporated within the armature shaft and thus requires no additional space. Since the damper incorporates a hydraulic fluid, the damping characteristics are exponential with velocity, thus minimizing energy absorption when small vibrations are encountered which are not detrimental to the unit. Small torsional amplitude inputs at non-resonant frequencies will normally flex only the quill shaft and thus impose little or no wear on the damper components. The hydraulic fluid employed within the spline cavities will serve to lubricate the sliding surfaces of the free spline, thus minimizing wear. Radial isolation of the quill shaft and armature shaft at the drive end permits a maximum misalignment between the engine pad and the generator pad. This misalignment is accommodated by flexural bending of the quill shaft proper, a condition for which it is designed. In other words, in my damper device, I employ a quill shaft and a spline to which the damping action is effected by the motion of the loose spline.

I claim:

1. In a machine having a hollow shaft adapted to be rotatably driven by a pulsating power source, a flexible quill shaft extending axially inside of said hollow shaft, said quill shaft having a direct driving connection at its input end to a member directly driven by said pulsating source, said quill shaft being provided near its other end with external radial splines arranged to loosely mate with internal radial splines in said hollow shaft with appreciable rotational clearance to constitute the sole driving connection between said shafts and hydraulic fluid interposed in the cavities between said loosely mating splines to provide a fluid damper for suppressing vibrations in said quill shaft.

2. In a machine having a hollow shaft adapted to be rotatably driven by a pulsating engine power source, a flexible quill shaft extending axially inside of said hollow shaft, said quill shaft having a direct driving connection at its input end to a member directly driven by said engine pulsating source, said quill shaft being provided near its other end with external splines arranged to loosely mate with internal radial splines in said hollow shaft with appreciable rotational clearance to constitute the sole driving connection between said shafts and hydraulic liquid interposed in the cavities between said loosely mating splines to provide a hydraulic liquid damper for suppressing vibrations in said quill shaft.

3. In an electric generator having a hollow armature shaft adapted to be rotatably driven by a pulsating engine power source, a flexible quill shaft extending axially inside of said hollow shaft, said quill shaft having a direct driving connection at its input end to a member directly driven by said engine pulsating source, said quill shaft being provided near its other end with external radial splines arranged to loosely mate with internal radial splines in said hollow armature shaft with appreciable rotational clearance to constitute the sole driving connection between said shafts and hydraulic liquid interposed in the cavities between said loosely mating splines to provide a hydraulic liquid damper for suppressing vibrations in said quill shaft.

4. In a machine having a hollow shaft adapted to be rotatably driven by a pulsating power source, a flexible quill shaft extending axially inside of said hollow shaft, said quill shaft having a direct driving connection at its input end to a member directly driven by said pulsating source, said quill shaft being provided near its other end with external radial splines arranged to loosely mate with internal radial splines in said hollow shaft with appreciable rotational clearance therebetween to constitute the sole driving connection between said shafts and hydraulic liquid interposed in the cavities between the side walls of said loosely mating splines to provide an hydraulic fluid damper for suppressing vibrations in said quill shaft, the radial extremities of said splines of one shaft and the bottoms of the cavities between the splines of the other shaft having relatively small operating clearances.

5. In a machine having a hollow shaft adapted to be rotatably driven by a pulsating power source, a flexible quill shaft extending axially inside of said hollow shaft, said quill shaft having a direct driving connection at its input end to a member directly driven by said pulsating source, said quill shaft being provided near its other end with external radial splines arranged to loosely mate with internal radial splines in said hollow shaft with appreciable rotational clearance therebetween to constitute the sole driving connection between said shafts and hydraulic liquid interposed in the cavities between the side walls of said loosely mating splines to provide a hydraulic liquid damper for suppressing vibrations in said quill shaft and axially spaced spacer members carried by quill shaft for defining the axial length of the effective operating area of said hydraulic drive between said spacer members.

6. In a machine having a hollow shaft adapted to be rotatably driven by a pulsating power source, a flexible quill shaft extending axially inside of said hollow shaft, said quill shaft having a direct driving connection at its input end to a member directly driven by said pulsating source, said quill shaft being provided near its other end with external radial splines arranged to loosely mate with internal radial splines in said hollow shaft with appreciable rotational clearance therebetween to constitute the sole driving connection between said shafts and hydraulic liquid interposed in the cavities between the side walls of said loosely mating splines to provide a hydraulic liquid damper for suppressing vibrations in said quill shaft, axially spaced spacer members carried by quill shaft for defining the axial length of the effective operating area of said hydraulic drive between said spacer members and for providing end clearance between each axial end of said hollow shaft splines and said spacer members for providing end circulation of said liquid in and between said cavities.

References Cited in the file of this patent

UNITED STATES PATENTS

| | | |
|---|---|---|
| 1,965,742 | Junkers | July 10, 1934 |
| 2,658,361 | Kalikow | Nov. 10, 1953 |